Feb. 19, 1924. W. P. THOMSON Re. 15,773

CONSTRUCTION FOR RAIL JOINTS

Original Filed Jan. 17, 1921 3 Sheets-Sheet 1

Inventor
William P. Thomson,

WITNESSES:-
Chas. L. Grieshauer
Emory L. Boff

By S. P. Wolhaupter
Attorney

Feb. 19, 1924. Re. 15,773

W. P. THOMSON

CONSTRUCTION FOR RAIL JOINTS

Original Filed Jan. 17. 1921 3 Sheets-Sheet 2

Inventor

William P. Thomson,

By L. P. Wolhaupter

Attorney

WITNESSES:-

Chas. L. Grieshauer

Emory L. Groff

Feb. 19, 1924. Re. 15,773

W. P. THOMSON

CONSTRUCTION FOR RAIL JOINTS

Original Filed Jan. 17. 1921 3 Sheets-Sheet 3

Inventor

William P. Thomson,

By D. P. Wolhaupter

Attorney

WITNESSES:-

Chas. L. Giezbauer

Emory L. Groff

Reissued Feb. 19, 1924.

Re. 15,773

UNITED STATES PATENT OFFICE.

WILLIAM P. THOMSON, OF NEW YORK, N. Y., ASSIGNOR TO THE RAIL JOINT COMPANY, OF NEW YORK, N. Y., A CORPORATION OF NEW YORK.

CONSTRUCTION FOR RAIL JOINTS.

Original No. 1,374,782, dated April 12, 1921, Serial No. 437,898, filed January 17, 1921. Application for reissue filed September 29, 1923. Serial No. 665,695.

*To all whom it may concern:*

Be it known that I, WILLIAM P. THOMSON, a citizen of the United States, and a resident of New York, county of New York, and State of New York, have invented new and useful Improvements in Construction for Rail Joints, of which the following is a specification.

This invention relates to rail joint construction and has particularly in view a novel combination of features in the construction and mounting of a rail joint intended to provide an adequate remedy correcting certain defects due to present practice.

Primarily it is the purpose of the invention to provide a well designed joint bar having its head bar structure so related to the web and underside of the rail head as to provide for a novel seating and adjustment of the bar, obtaining a new ratio of transverse to vertical stiffness, while also meeting all the requirements of a good splice having the facilities for being readily tightened to take up wear and looseness, at the same time establishing an exceptional relation of vertical resiliency and transverse stability. This exceptional relation of vertical resiliency and transverse stability is designed to produce a rigid and powerful transverse grip on the upper portion of the rail within a region which is closer to the center of gravity of the rail than has hitherto been the common practice, thus assuring absolutely true rail head alinement while at the same time reducing or freeing altogether, the rail head from splice bar bearing so as to leave the rail head with approximately the same resiliency at the joint as it has elsewhere along the rail. This freedom of the rail head vertically will have the effect of reducing the tendency of the rails to batter at their ends and will also permit the load wave to pass the joint under practically the same conditions that it advances along the unbroken rail. In those particulars, the present invention represents an improvement upon and carrying forward of the invention of my former Patent No. 1,005,583, dated October 10, 1911.

The particular object of the invention, in addition to perpetuating the desirable features of the joint construction of my Patent No. 1,005,583 is to obviate the defects in present practice resulting from the production and use of a splice bar which is full in the fishing and deficient in vertical resiliency. With such a bar, the present practice of wedging it against both of the fishing faces of the rail not only makes the joint very rigid vertically but also causes the bar to stand away from the rail web to an extent which increases in direct proportion to the increase in the amount of fullness in the fishing distance which results from the rolling tolerance. These conditions are familiar to those acquainted with track maintenance and rolling mill practices, and from both stand-points are objectionable.

From a track maintenance stand-point, it is a defect to have even a slight advancement of the splice bar outwardly from its normal location, because such a condition usually brings the outer surface of the top corner of the head of the splice bar into the region of interference with the wheel flanges. Also the wedging on both fishing surfaces referred to leads to a defect from a track maintenance stand-point because wear of the rail and splice bar in service alters the fishing distance of the rail and of the splice bar producing looseness of fit, and furthermore bending and stretching of the bolts invariably follows such loosening of the splice bars.

The above enumerated, as well as other, defects considered from the stand-point of track maintenance are remedied by the present invention.

The defects and difficulties due to present rolling mill practices are, as indicated, an important consideration. Principal among these is the difficulty, in the rolling mill, of keeping within tolerances for fishing distances which would produce even reasonably satisfactory fit of the splice bar to the rail.

The present invention is intended to give much greater rolling tolerance which facilitates designing the bar to fit several sections of rail which vary only slightly in the height of the fishing distance of the rail or in the degree of angularity of the fishing surface of the underside of the rail head. This advantage involves substantial economies in manufacture and relieves the roller of the necessity of exercising that great care which he must now observe to keep within tolerances for fishing distance which will produce even reasonably satisfactory fit of the splice bar to the rail.

Furthermore, another important attribute of the present invention, is a novel redesigning of the bar head so that the section modulus of the top of any particular splice bar is substantially greater than that of the corresponding splice bar which has a top conforming to the generally recognized old angle bar form. Therefore, an important object of the invention is to so modify the type of splice bar having its head enlarged laterally, or both laterally and vertically, combined with a novel method of application and maintenance, as to preserve all of the desirable structural advantages of the type of bar now generally known as the "100% joint," while at the same time satisfactorily meeting the defects growing out of the present practice above referred to.

With these and such other objects in view, as will more readily appear to those familiar with the subject, the invention consists in the novel structural features and combination of elements hereinafter more particularly described, illustrated and claimed. The invention, having the scope indicated, is necessarily susceptible of a wide range of structural modification without departing from the spirit or principle thereof, but for illustrative purposes, a few preferable and practical embodiments of the invention are shown in the accompanying drawings, in which:—

Like references designate corresponding parts in the several figures of the drawings.

Figure 1:
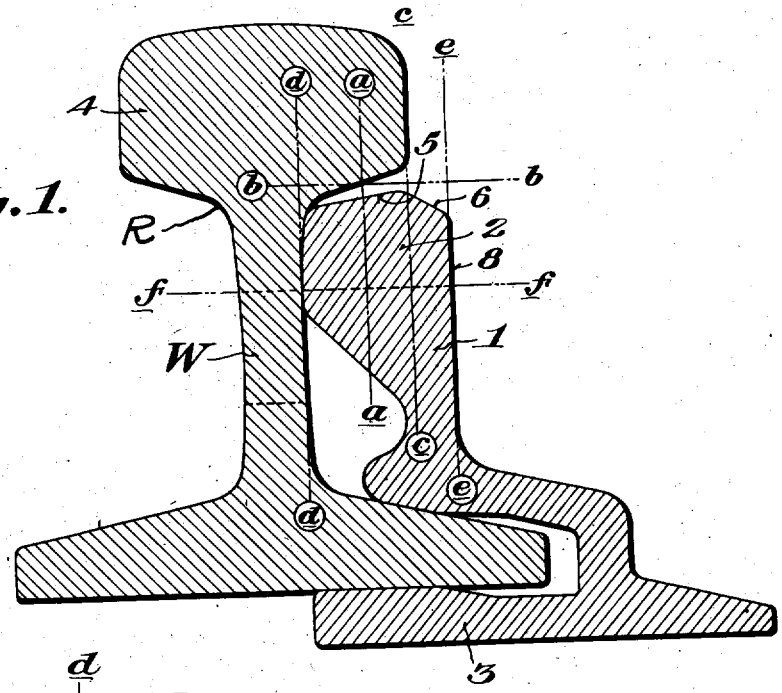
Figure 1 is an end view of a joint bar and rail combining to provide the features of the present invention, the view including dotted lines of certain planes, to which the joint construction bears an operative relation.

The present improvements are applicable to various shapes and forms of rail joint bars, but possess special utility in connection with the "Thomson and Thomson 100%" joint construction. That construction is realized in a given splice bar wherein the section modulus of its top is substantially greater than that of a splice bar whose top conforms to the generally recognized old angle bar form. In such given splice bar of the 100% type referred to, the head of the bar is usually laterally enlarged, as well as materally deepened to obtain a head of great strength, and the present invention takes the fullest advantage of this feature of the bar and permits of considerably greater latitude in both the widening and deepening of the head without causing or even permitting wheel flange interference. Therefore, for the purposes of the present application, there is shown in Fig. 1 of the drawings a joint bar 1 of the type having an enlarged widened head 2. Also in the illustrated form, the said joint bar 1 is of the continuous or base supporting type of joint, employing a rail base supporting member 3. The head 2 of the bar, according to the present invention, bears a definite operative relation to the rail R having the usual web W and head 4. It also bears a definite relation to a certain working area defined approximately at least by certain points and planes, as for instance the longitudinal vertical plane *a—a* bisecting the rail head fishing surface, the horizontal plane *b—b* which bisects the said fishing surface of the rail head, the vertical plane *c—c* intersecting the outermost portion of the head of the rail, the vertical plane *d—d* being tangent to the curving side of the rail web, the vertical plane *e—e* within which is normally located the outer vertical bolting face of the joint bar and the horizontal plane *f—f* lying at the top of the bolt holes through the rail.

It will now be seen from what is demonstrated by Fig. 1 of the drawings, that the enlarged head 2 of the joint bar is provided with a top clearance surface 5, an outer corner truncation 6 and an inner head projection 7. As shown, the feature of truncating the outer corner of the head of the bar as at 6 is intended to make the bar sufficiently low at this point, under all conditions and under all adjustments as to produce complete and safe wheel flange clearance without in any way interfering with the distribution of metal in the lateral enlargement of the head making a head section of any prescribed strength. In conjunction with the outer corner truncation 6, the top clearance surface 5 of the joint bar represents that feature of the invention which provides for considerable latitude in the rolling mill tolerance. That is to say, according to the present invention, it is proposed to reduce the height of the bar to allow considerable mill tolerance, ranging between the horizontal plane *f—f*, of the bolt holes and the top edge 5 of the bar, and having reduced or no contact with the under side of the rail head. The tolerance referred to depends largely upon the height of the fishing distance of the rail but in all cases allows greater latitude in rolling than is permissible under present practice. Clearance, either partial or entire, from the fishing surface of the rail head necessarily provides this wide range of tolerance in the height of splice bars, in the process of rolling, thus greatly simplifying and cheapening the rolling process at the same time keeping the upper outer tip of the bar sufficiently inside of the wheel flange interference to permit a fin to occur at that point of the bar without the expensive necessity of removing such fin.

The inner head projection 7 of the bar plays an important function in combination with the fillet joining the web and head of the rail and with the rail web W which has a cross-sectional wedge formation approximately above the center line of the bolt holes, thereby presenting upwardly and outwardly inclining surfaces against which the bar head bears and rides. In other words, the inner head abutment or projection of the bar head has a sliding bearing contact with the upwardly and outwardly inclining surface of the rail web, so that as the inner head bearings of the splice bars move upwardly and outwardly on the rail surfaces the vertical bolt faces 8 of the upper portions of the splice bars will be jammed outwardly slightly, but enough to produce a tightening effect upon the nuts, even after the latter have been made tight by normal wrenching.

In the embodiment shown in Figs. 1 and 2 of the drawings, the inner head projection or abutment 7 is of considerable depth, extending from the top of the bar to a point below the plane *f—f* at the top of the bolt holes, thus presenting a wide and substantial abutment for engagement with the rail, but it is to be observed that the upward and outward movement of the head of each splice bar, when bearing directly upon the upper part of the rail web, and in some instances upon the upper fillet connecting the web with the head, serves to decrease the frictional bearing area of the splice bar head on the rail web by reason of its contacting with the rail along only narrow lines of contact. This is graphically shown in Fig. 2 of the drawings. The full line position of this figure represents the bar head having an initial broad bearing contact with the rail web, but under the influence of force applied by maul or otherwise to the foot of the bar, the head rides upwardly and outwardly on the upwardly and outwardly inclining part of the rail, resulting in carrying the major part of the head out of contact with the rail web and reducing the bearing on the rail to the narrow lines of contact 9—9 at the inner upper and lower corners of the bar head. This is brought about without bringing the top of the bar into contact with the under side of the rail head or without carrying the outer corner of the bar into the zone of wheel flange interference. This decrease in the frictional bearing area of the contact of the splice bar head with the rail permits the rail more freely to expand and contract longitudinally than when gripped by the whole area of the inner face of the splice bar head, particularly when clamped with such unyielding force as is obtained by the use of high tensile bolts. This object is attained with practically no variation in the out-to-out distance between the bolting faces 8 of the opposite splice bars, such distance being measured along the center line of the bolts, and without diminishing the tolerance allowed by the clearance between the head of the bar and the underside of the head of the rail.

Figure 3:
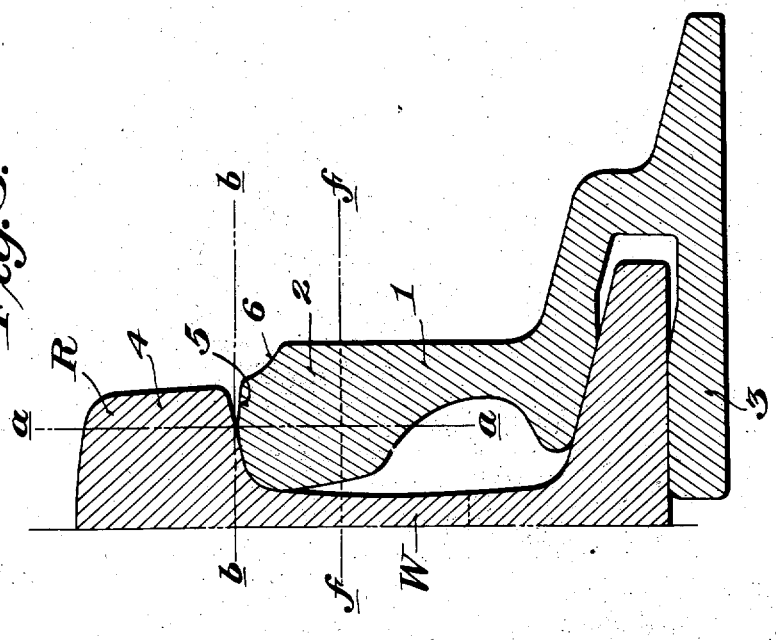
Fig. 3 is a view similar to Fig. 1 exemplifying the range of tolerance permitted by the present invention between the upper side of the bar head and the fishing bearing of the rail head.
Figure 5:
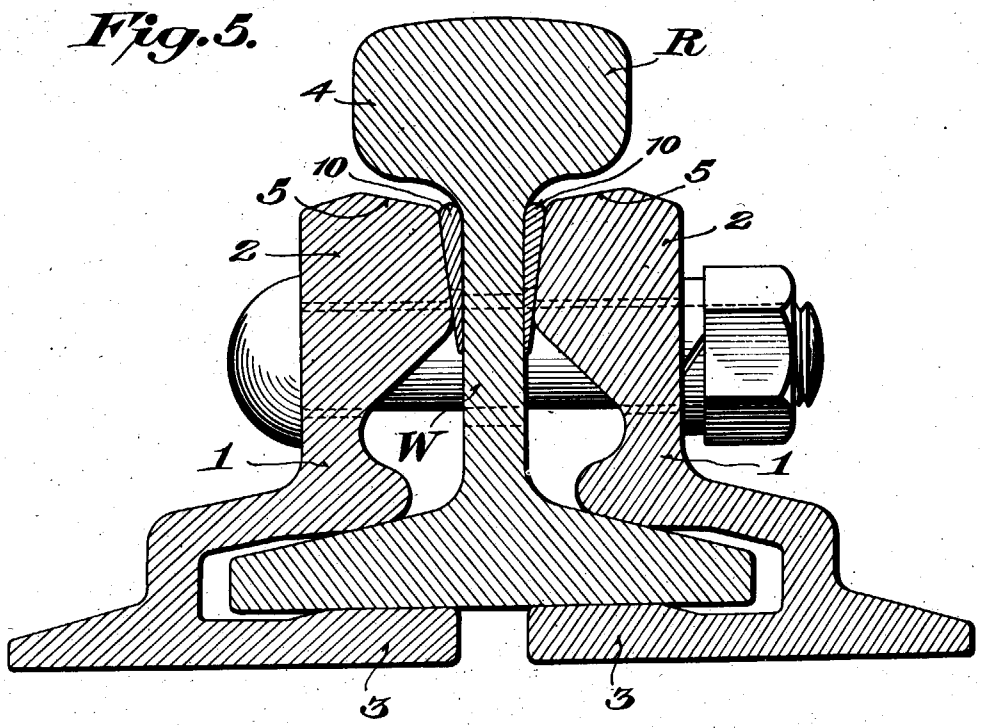
Fig. 5 is a detail view showing a modification of the invention wherein an intervening spacer provides the solid metal bearing of the inner part of the bar head against the rail.

By way of illustrating the range of modification that may be resorted to in the carrying out of the invention, there is shown in Fig. 3 of the drawings a form wherein the inner head projection of the bar takes a solid fulcrum bearing against the portion of the rail at and adjacent the fillet between the web and the under side of the rail head and the top surface 5 of the bar head has a reduced contact with the underside of the rail head. That is to say, the top surface 5 of the bar head has contact with what may be termed the inner portion of the rail head fishing surface inside of the previously defined longitudinal vertical plane *a—a* but has clearance from that outer portion of the rail head fishing surface which lies outside of the plane *a—a*, the clearance preferably commencing at said longitudinal vertical plane *a—a* which corresponds with the intersection of the planes *a—a* and *b—b*. In all other respects, the modified form of Fig. 3 has the same structural and functional characteristics as the primary form of the invention already described.

Figure 4:
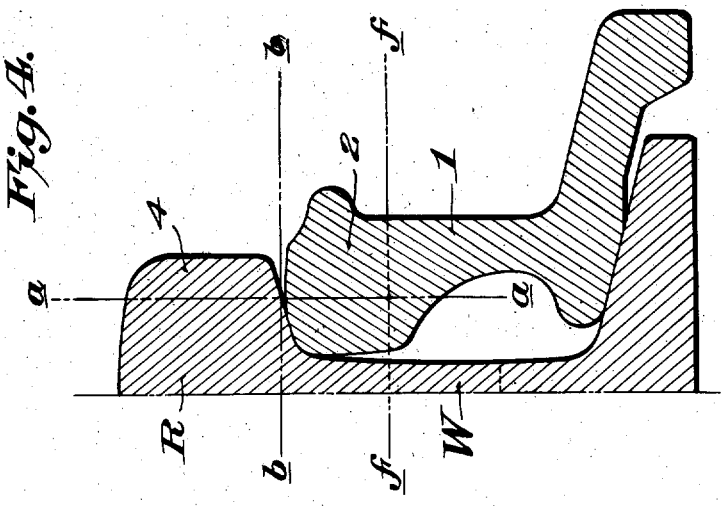
Fig. 4 is an end view of a joint bar and of a rail showing the application of the improvements to a splice bar having no rail base supporting member.

Furthermore, the invention is applicable not only to a base supporting type of bar but also to a splice bar of the non-base supporting type, an example of which is shown in Fig. 4 of the drawings. In this illustration, a further example is given of the range of tolerance allowed by the present invention. This is shown by the bar of Fig. 4 having an exceedingly limited contact with the fishing surface of the rail head with the clearance commencing at a point inside of the plane *a—a* and progressively increasing outward so as to not interfere with the feature of an enlarged widened head and safe wheel flange clearance.

While the forms of the invention so far described have represented the preferable feature of having direct metal contact between the inner part of the bar head and the rail, a structural modification which may be made in that respect is to insert an intervening metallic spacer plate 10 between the rail and the inner part of the bar head, as in some cases it might be desirable to introduce this additional element, for instance to permit a splice bar not integrally embodying this improvement to function the same as a bar designed to carry out the principle of this invention, but its use in no way interferes with the full functioning of the invention as herein pointed out.

Figure 2:
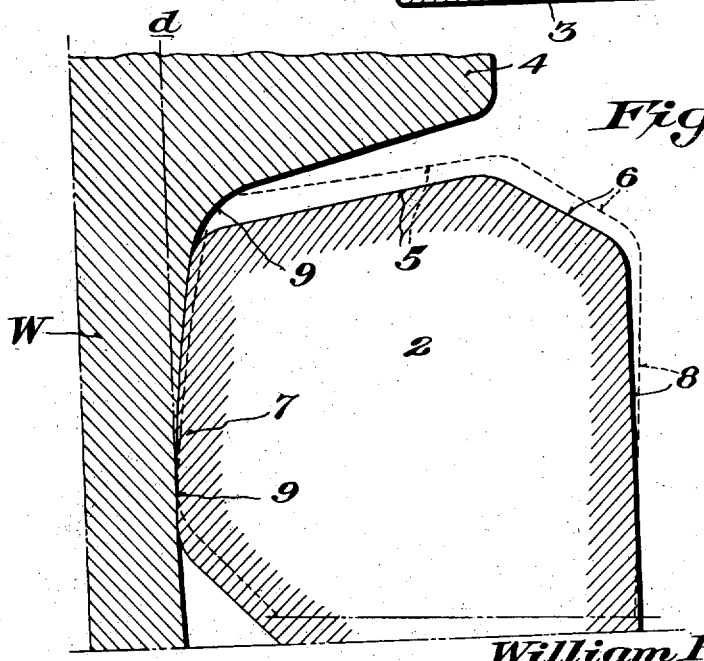
Fig. 2 is an enlarged view of the head portion of the bar and the upper portion of the rail, showing by exaggeration the peculiarly novel relation which is maintained between the head of the bar, and the web and head of the rail, the full and dotted lines representing two positions taken by the bar head.

By way of briefly recapitulating the function mechanically of the combination of features described, it will be noted that after the bolts are tightened normally, the base of the bar may be mauled or driven inwardly, rotating the bar on a longitudinal axis located approximately within the region of the bolt holes causing the head of the bar to ride upwardly and outwardly due to the upwardly and outwardly inclining part of the rail and thereby canting the outer bolting face 8 (lying within the plane *e—e*) toward and against the upper portions of the nuts, this action slightly canting the said bolting face from its normal vertical plane, and serving to act as a nut lock, at the same time decreasing the frictional bearing of the splice bar on the upper portion of the rail with such forms of the invention as shown in Figs. 1 and 2. As previously pointed out, this adjustment occurs without materially spreading the out-to-out distance between the opposite splice bars along the plane of the center line of the bolt holes, thereby obviating excessive increase of bolt strain. The described action does not bring the upper outer corner of the head of the bar into the region of interference with the wheel flanges, and takes place regardless of whether the top edge of the head of the bar is partially in contact with the rail head or is entirely out of contact therewith. In those cases where contact occurs between the head of the bar and the rail head, such contact is limited to the inner portion of the fishing bearing of the rail head, preferably inside of the plane *a—a* bisecting said fishing bearing.

Further, in reference to the matter of contact of the splice bar head with the under side of the rail head, such contact may be entirely omitted, thus giving still greater mill tolerance, when the bar is embodied in the continuous or base-supporting type of bar; but, with the angle bar types of splices, as shown in Fig. 4 of the drawings, the reduced bearing contact such as indicated between the head of the bar and the head of the rail has a desirable structural advantage, as will appear to those familiar with the art.

From the foregoing, it is thought that the construction and functioning of the combination of features specially pointed out will be apparent without further description and it is understood that changes in the form, proportion and minor details of construction may be resorted to without departing from the spirit or sacrificing any of the advantages of the invention.

I claim:—

1. A rail joint, including the rail, clamping bolts, a splice bar having head clearance from the under side of the rail head and a loading engagement at the head fillet of the rail.

2. A rail joint, including the rail, clamping bolts, and a splice bar having clearance from the under side of the rail head and an inner head projection which has an upwardly and outwardly sliding bolt-tightening engagement with the rail head fillet.

3. A rail joint, including the rail, clamping bolts, and a splice bar having clearance from the under side of the rail head and an engagement with the rail head fillet to bring the head of the bar into solid resistance to load deflections.

4. A rail joint, including the rail, clamping bolts, and a splice bar having clearance from the outer portion of the under side of the rail head, said splice bar having a head extending outwardly beyond the outer edge of the rail head and having an engagement with the rail head fillet to bring the head of the bar into solid resistance to load deflections.

5. A rail joint, including the rail, clamping bolts, and a splice bar having clearance from the under side of the rail head and having a head which extends outwardly beyond the outer edge of the rail head and which has an upwardly and outwardly sliding bolt-tightening engagement with the rail head fillet, said engagement being entirely inside of the inner boundary of the flat fishing surface of the rail head.

6. A rail joint, including the rails, clamping bolts, the opposite joint bars having clearance from the under sides of the rail heads and having heads which extend outwardly beyond the outer edges of the rail heads and which have upwardly and outwardly sliding bolt-tightening engagement with the rail head fillets, each of the said bars having an axis of rotation substantially at the plane of the center line of the bolt holes.

7. A rail joint, including the rails, clamping bolts, the opposite joint bars having clearance from the outer portions of the under sides of the rail heads and having heads which extend outwardly beyond the outer edges of the rail heads and which have upwardly and outwardly sliding bolt-tightening engagement with the rail head fillets, each of the said bars having a longitudinal axis of rotation substantially within the region of the bolt holes.

8. A rail joint, including the rail, clamping bolts, and a splice bar having clearance from the under side of the rail head and having a head which has an outer truncated corner portion which extends outwardly beyond the outer edge of the rail head and which has clearance from wheel flanges, the head of said bar also having an upwardly and outwardly sliding bolt-tightening engagement with the rail head fillet.

9. The combination with the rail and clamping bolts, of a splice bar having a head which is broader horizontally than the fishing surface of the head of the rail which it is designed to fit, all the top surface of said head being free from contact with the outer portion of said rail head fishing surface, and a portion of said top surface underlying all of said rail head fishing surface, the head of said splice bar having a sliding bolt-tightening engagement with the head fillet of the rail.

10. The combination with the rail and clamping bolts, of a splice bar having a rail-fillet bearing head, part of the top of which underlies and is free from contact with the outer portion of the fishing surface of the rail head, and also having an upright outer face for bolt fastening bearings, the free top portion of said splice bar head intersecting two parallel vertical planes which are separated to an extent greater than the width of the disengaged portion of the fishing surface of the rail head, one of said planes being the plane of the bolt fastening bearings and the other of said planes being at the innermost line of contact between the rail and the splice bar.

11. The combination with the rail and clamping bolts, of a splice bar having a head-loading engagement and extending from the rail web through and beyond a vertical plane at the outer-most part of the rail head, all of the top of said splice bar head being free from contact with the rail head above a horizontal plane which bisects the fishing surface of the rail head, and a part of said splice bar head which lies below said horizontal plane being firmly in contact with the head fillet.

12. In a rail joint, a rail, clamping bolts, and a splice bar having a head which extends substantially outward beyond the edge of the rail head, said splice bar head being free from contact with approximately the outer half of the rail head fishing surface and having a greater extent of initial bearing on the rail between the center of the bolt holes and the inside boundary of the flat fishing surface of the rail head than it has on said flat fishing surface of the rail head, to bring the head of the splice bar into solid resistance to load deflections.

In testimony whereof I hereunto affix my signature in the presence of two witnesses

WILLIAM P. THOMSON.

Witnesses:
E. K. KERSNER,
KATHERINE MCNALLY.